(12) United States Patent
Carzino et al.

(10) Patent No.: US 8,877,858 B2
(45) Date of Patent: Nov. 4, 2014

(54) TECHNIQUE FOR STABILIZING SOLUTIONS OF TITANIUM DIOXIDE NANOPARTICLES IN ACRYLATE POLYMERS BY MEANS OF SHORT-PULSED UV LASER IRRADIATION

(75) Inventors: Riccardo Carzino, Serra Ricco' (IT); Francesca Pignatelli, Genoa (IT); Marco Scotto, Genoa (IT); Bruno Torre, Stella S. Martino (IT); Gianvito Caputo, Mola di Bari (IT); Pantaleo Davide Cozzoli, Lecce (IT); Athanassia Athanassiou, Arnesano (IT); Roberto Cingolani, Arnesano (IT)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 0 days.

(21) Appl. No.: 13/636,990

(22) PCT Filed: Mar. 28, 2011

(86) PCT No.: PCT/IB2011/051301
§ 371 (c)(1),
(2), (4) Date: Sep. 24, 2012

(87) PCT Pub. No.: WO2011/121519
PCT Pub. Date: Oct. 6, 2011

(65) Prior Publication Data
US 2013/0012650 A1 Jan. 10, 2013

(30) Foreign Application Priority Data
Mar. 29, 2010 (IT) .............................. TO2010A0240

(51) Int. Cl.
| | | |
|---|---|---|
| *C08K 3/32* | (2006.01) | |
| *C08L 33/12* | (2006.01) | |
| *B82Y 20/00* | (2011.01) | |
| *B82Y 30/00* | (2011.01) | |
| *C08J 3/215* | (2006.01) | |
| *C09D 7/12* | (2006.01) | |
| *C08J 5/18* | (2006.01) | |
| *C08J 3/28* | (2006.01) | |
| *C08K 3/22* | (2006.01) | |

(52) U.S. Cl.
CPC .. *C08J 5/18* (2013.01); *B82Y 30/00* (2013.01); *C08J 2333/02* (2013.01); *C08J 3/215* (2013.01); *C09D 7/1216* (2013.01); *C09D 7/1258* (2013.01); *C08K 3/22* (2013.01); *C08J 3/28* (2013.01); *C08J 2333/06* (2013.01); *Y10S 977/773* (2013.01); *Y10S 977/811* (2013.01)
USPC ............ 524/560; 524/432; 977/773; 977/811

(58) Field of Classification Search
CPC .. B82Y 30/00; C08J 2333/02; C08J 2333/06; C08J 3/215; C08J 3/28; C08J 5/18; C08D 7/1216; C08D 7/1258
USPC .......................... 524/560, 432; 977/773, 811
See application file for complete search history.

(56) References Cited

PUBLICATIONS

Sciancalepore et al. "TiO2 nanorods/PMMA copolymer-based nanocomposites: highly homogeneous linear and nonlinear optical material", Nanotechnology, vol. 19, No. 20, (2008), pp. 1-8.*
Zan, L. et al. "A Novel Polymethyl Methacrylate (PMMA)—TiO2 Nanocomposite and its Thermal and Photic Stability", Wuhan University Journal of Natural Sciences, vol. 11, No. 2, 2006, pp. 415-418.*
Pignatelli et al. "Directional enhancement of refractive index and tunable wettability of polymeric coatings due to preferential dispersion of colloidal TiO2 nanorods towards their surface", Thin solid films, Hin Solid Films, Elsevier-Sequoia S.A. Lausanne, CH, vol. 518, No. 15, Feb. 2, 2010, pp. 4425-4431, XP027035294.*
Cozzoli, P.D. et al. "Low-Temperature Synthesis of Soluble and Processable Organic-Capped Anatase $TiO_2$ Nanorods", J. Am. Chem. Soc., vol. 125, 2003, pp. 14539-14548.
International Search Report for corresponding International Patent Application No. PCT/IB2011/051301 mailed Aug. 4, 2011.
Pignatelli, F. et al. "Directional enhancement of refractive index and tunable wettability of polymeric coatings due to preferential dispersion of colloidal $TiO_2$ nanorods towards their surface", Thin Solid Films, vol. 518, No. 15, Feb. 2, 2010, pp. 4425-4431.
Convertino, A. et al. "$TiO_2$ colloidal nanocrystals functionalization of PMMA: A tailoring of optical properties and chemical adsorption", Sensors and Actuators B, vol. 126, No. 1, Sep. 20, 2007, pp. 138-143.
Caputo, G. et al. "Determination of surface properties of various substrates using $TiO_2$ nanorod coatings with tunable characteristics", Journal of Materials Science, vol. 43, No. 10, Mar. 4, 2008, pp. 3474-3480.
Sciancalepore, C. et al. "$TiO_2$ nanorods/PMMA copolymer-based nanocomposites: Highly homogeneous linear and nonlinear optical material", Nanotechnology, vol. 19, No. 20, May 21, 2008, pp. 1-8.
Zan, L. et al. "A Novel Polymethyl Methacrylate (PMMA)—$TiO_2$ Nanocomposite and its Thermal and Photic Stability", Wuhan University Journal of Natural Sciences, vol. 11, No. 2, Feb. 28, 2006 pp. 415-418.

* cited by examiner

*Primary Examiner* — Michael M Bernshteyn
(74) *Attorney, Agent, or Firm* — Merchant & Gould P.C.

(57) ABSTRACT

A method for preparing a colloid solution of titanium dioxide nanoparticles in a solution of acrylic resin in organic solvent includes mixing titanium dioxide nanoparticles with a solution of acrylic resin in organic solvent, so as to obtain the colloid solution. The colloid solution is subjected to a stabilization treatment suitable for preventing or reducing nanoparticle aggregation, the treatment includes irradiating the colloid solution with pulsed coherent light having a wavelength substantially comprised in the ultraviolet absorption band of the titanium dioxide nanoparticles.

10 Claims, 7 Drawing Sheets

TECHNIQUE FOR STABILIZING SOLUTIONS OF TITANIUM DIOXIDE NANOPARTICLES IN ACRYLATE POLYMERS BY MEANS OF SHORT-PULSED UV LASER IRRADIATION

This application is a National Stage Application of PCT/IB2011/051301, filed 28 Mar. 2011, which claims benefit of Serial No. TO2010A000240, filed 29 Mar. 2010 in Italy and, which applications are incorporated herein by reference. To the extent appropriate, a claim of priority is made to each of the above disclosed applications.

BACKGROUND OF THE INVENTION

The present invention refers to a method for preparing a colloid solution of titanium dioxide nanoparticles in a solution of acrylic resin in organic solvent.

As known, solutions of acrylate-based polymers and titanium dioxide nanoparticles are used to produce polymeric films based on acrylate doped with titanium dioxide nanoparticles, through spin coating or evaporation techniques. Films of this type can be used for example in the production of optical devices, in opto-electronics (for example in making waveguides), in the production of rigid and thermoresistant transparent layers, in photovoltaics, in chemical sensors and in the field of biology.

Generally, the production of polymeric films doped with nanoparticles suffers from nanoparticle aggregation, said nanoparticles accumulating on the surface of the film due to the low affinity between polymer and nanoparticles (phase separation). Currently, the techniques used to obtain homogeneous films of plastic material doped with titanium dioxide nanoparticles are chemical in nature (use of copolymers) [1], functionalising the surface of the nanoparticles with different organic capping molecules [2], exploiting the photo-polymerisation of the plastic material starting from the constituent monomers with the addition of chemical additives [3], and in general the transparency is ensured to a large extent by the deposition of thin films (0.1-1 μm) and with low concentrations of the polymer (50 mg/ml). Although in the literature there are some examples of studies on this, an effective method capable of allowing a homogeneous dispersion of nanoparticles inside a polymer has not yet been developed.

SUMMARY OF THE INVENTION

The purpose of the invention is to provide a method for preparing a colloid solution of titanium dioxide nanoparticles in a solution of acrylic resin in an organic solvent, in which the degree of dispersion of the nanoparticles can be simply adjusted as a function of the needs of use of the solution.

In view of this purpose, the object of the invention is a method for producing a colloid solution of titanium dioxide nanoparticles in a solution of acrylic resin in organic solvent.

The method according to the invention makes it possible to stabilize and homogenise a solution containing titanium dioxide nanoparticles and acrylic resin to the point of a total dispersion of the particles in the polymeric matrix; from the aforementioned solution it is possible to obtain thin films, and even thick ones, maintaining the properties of transparency of the polymer in the visible range and increasing its absorption in the ultraviolet range. The material that can thus be obtained has optical and physical properties that can be adjusted as a function of the ratio between the weight concentrations of nanoparticles and polymer.

The achievement of such properties does not require any specific chemical treatment of the polymer or of the nanoparticles, this being a factor that allows the production costs of the films to be significantly reduced.

BRIEF DESCRIPTION OF THE DRAWINGS

Further characteristics and advantages of the method according to the invention will become clear from the following detailed description, carried out with reference to the attached drawings, provided purely as a non-limiting example, in which.

Figure 13:
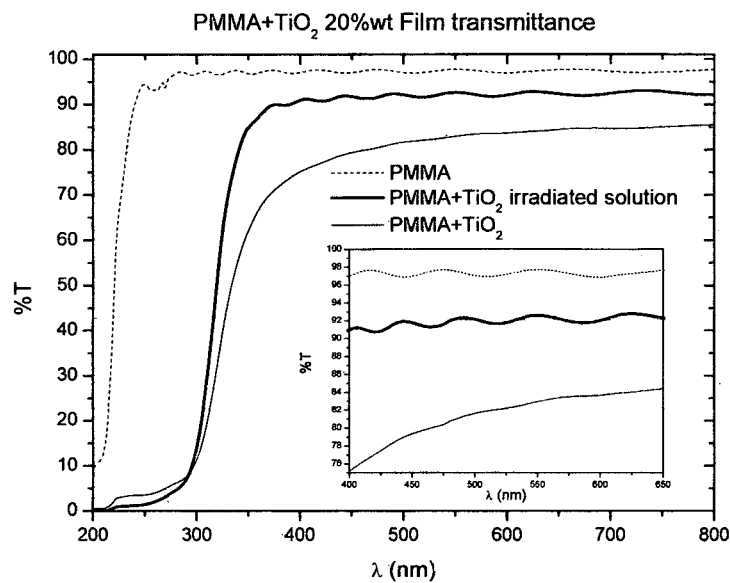
FIG. 13 represents a comparison of the transmittance between a film of just PMMA (broken line), an untreated film of PMMA+$TiO_2$ 20% wt (thin line), and a film of PMMA+$TiO_2$ 20% wt treated according to the invention (thick line). The transmittance in the visible range is shown in the insert.
Figure 14:
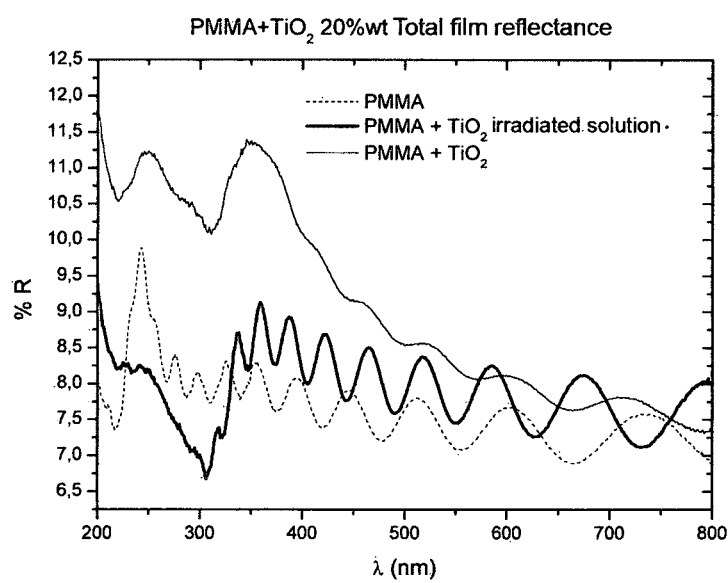
FIG. 14 represents a comparison of the total reflectance between a film of just PMMA (broken line), an untreated film of PMMA+$TiO_2$ 20% wt (thin line), and a film of PMMA+$TiO_2$ 20% wt treated according to the invention (thick line). The films are the same ones on which the measurements of FIG. 13 were carried out.
Figure 16:
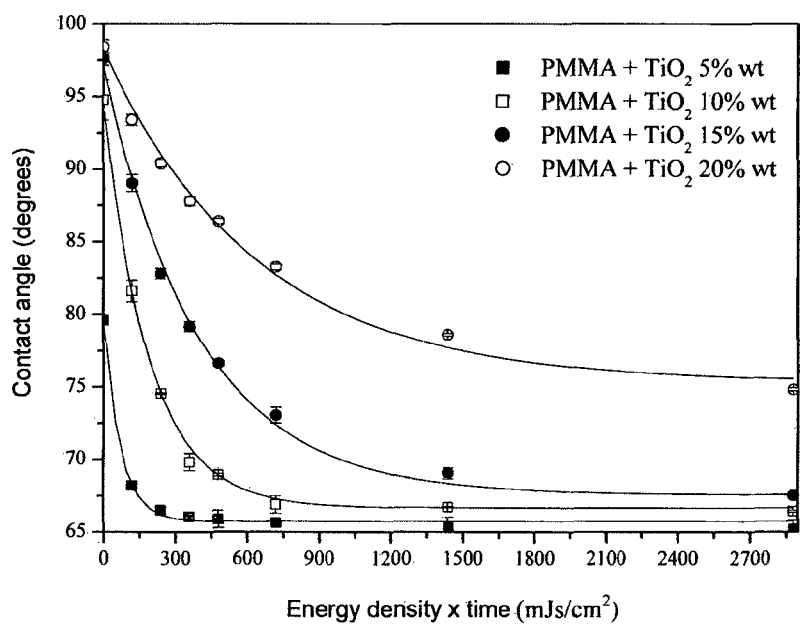
Figure 17:
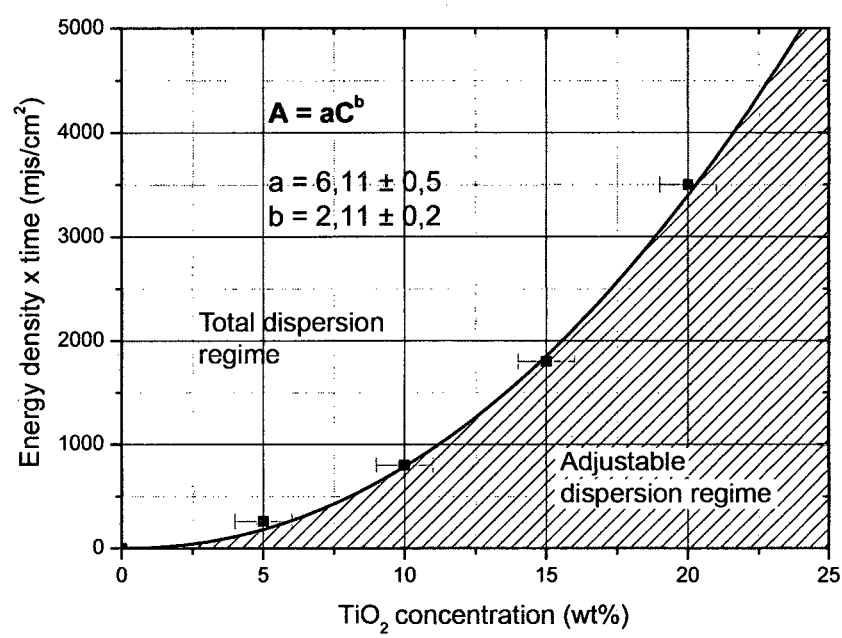
Figure 18:
Figure 19:
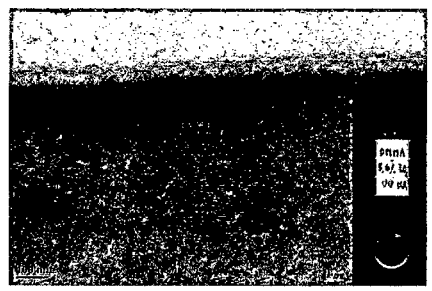

The films are the same ones on which the measurements of FIGS. 13 and 14 were carried out;

FIG. 16 shows a graph that displays the contact angle values with the water (wettability index) for different films at different concentrations of titanium dioxide nanoparticles for different values of energy density times irradiation time;

FIG. 17 shows a graph that identifies two different dispersion conditions of the titanium dioxide nanoparticles in the films obtained, as a function of the concentration of the nanoparticles in the starting solutions and as a function of the energy density times irradiation time of the solutions themselves; and FIGS. 18 and 19 represent TEM images of thin slices of nanocomposite film, respectively not treated and treated with the technique according to the invention.

DETAILED DESCRIPTION OF THE PREFERRED EMBODIMENT

We will now describe a method for preparing a colloid solution of titanium dioxide nanoparticles in a solution of acrylic resin in organic solvent.

In such a method, the titanium dioxide nanoparticles are prepared chemically in a per se conventional way, generally in the form of dispersion in a liquid organic dispersant. In such a form, the aforementioned nanoparticles are generally coated with a surfactant, like for example oleic acid. For the purposes of the present invention, by nanoparticles we mean particles having dimensions smaller than 1 μm, and in particular smaller than 100 nm, such as nanobars or nanospheres.

A solution is also prepared that is made up of an acrylic resin dissolved in a liquid organic solvent with respect to which such a resin is soluble, for example toluene or chloroform. The substance used as solvent for the resin generally coincides with the substance used as dispersant for the titanium dioxide nanoparticles.

The acrylic resins that can be used in the invention comprise polymers of acrylic or methacrylic acid, polymers of alkyl esters of acrylic acid and of methacrylic acid such as acrylates or methacrylates of methyl, ethyl, butyl or 2-ethyl-hexyl, both in the form of homopolymers and of copolymers. An essential condition is that the acrylic resin used is transparent to the wavelength of the radiation used for the stabilization treatment according to the invention, which will be described hereafter.

Thereafter, such nanoparticles and solution are mixed together, so as to obtain a colloid solution of the nanoparticles in the solution of acrylic resin, in which polymer and nanoparticles are mixed in the best possible way, obtaining a substantial homogeneity of dispersion.

The solution thus obtained is subjected to a stabilization treatment suitable for preventing or at least reducing nanoparticle aggregation, in which the colloid solution is irradiated with pulsed coherent light having a wavelength substantially comprised in the ultraviolet absorption band of the titanium dioxide nanoparticles.

Preferably, the coherent light used is a laser light having a wavelength equal to or less than 355 nm, a value below which the titanium dioxide of the nanoparticles begins to absorb it. For example, as laser light it is possible to use the third harmonic of a Nd:YAG laser. It is meant for the upper limit of the ultraviolet absorption band of the nanoparticles to depend on confinement effects related to the dimensions of such particles; for example, the limit of 355 nm indicated above refers to particles in the form of bars with a diameter of about 5 nm and a length of about 25 (+−5)nm. The lower limit of the ultraviolet wavelength that can be used is on the other hand set by the other materials involved at the moment of the ultraviolet treatment; in particular, such a limit is given by the greater value between the absorption threshold of the solvent used, that of the container of the nanoparticles/solution mixture, and that of the resin used.

The treatment according to the invention requires a relatively small amount of energy to be able to be carried out. In particular, the inventors have found that by applying radiation with energy density times irradiation time of less than 5000 $mJs/cm^2$, it is possible to stabilize solutions containing up to 20% by weight of nanoparticles of $TiO_2$ (the percentages by weight refer to the total weight of acrylic resin plus titanium dioxide nanoparticles, and thus to the weight of the film that can be obtained from the solution). To give an example, an average of 2.8 $mW/cm^3$ power per unit volume is already sufficient to stabilize in 1 hour 3 ml of solution at 5% by weight of $TiO_2$ contained in a quartz cuvette of 1 cm in length of the optical path.

The pulse duration of the laser impulses is preferably less than 1 ns, even more preferably less than 100 ps.

As can be understood from the following examples, by varying the dose of radiation with which the nanoparticles/solution mixture is irradiated it is possible to stabilize the nanoparticles so as to counteract their tendency to aggregate; the particles not stabilized by the polymer will tend to accumulate on the surface of the film obtained from the mixture, modifying their wettability as a function of their number. In this way it is possible to adjust the homogeneity of the dispersion of nanoparticles, and consequently the optical and physical properties of the film obtained by the solution.

The dispersion thus obtained is ready to be used in the production of a thin or thick film, for example through conventional techniques such as spin-coating or evaporation, without requiring further treatments to stabilize the dispersion of nanoparticles.

Some experiments have been carried out in which solutions of polymer and nanoparticles were subjected to irradiation with ultraviolet light.

For such experiments, the polymer used was PolyMethyl-Methacrilate (PMMA), Aldrich (M. W. 120000). PMMA is a plastic material formed from polymers of methyl methacrylate, an ester of methacrylic acid, also known by the trade names Plexiglas®, Perspex®, Lucite®, Vitroflex®, Limacryl® and Resartglass®.

A particular protocol was decided upon to be able to study films containing different amounts of $TiO_2$ and polymer while keeping their thickness constant. In order to obtain this, it is necessary to keep the concentration of the polymer in the solution constant. Firstly, the concentration was decided, defined as C1, of just the polymer in the organic solvent to obtain the desired thicknesses (in the spin-coating process the thickness of the films depends on the concentration and on the rotation speed of the support). Then a solution of the polymer that is more concentrated than what was decided (C2) was prepared.

Having expressed the concentration of nanoparticles in the dispersion in mg/ml, the weight of nanoparticles necessary to have the desired ratio between the two components was calculated as:

$$P_{TiO_2} = \frac{A \cdot B}{1 - A}$$

where:
A is the percentage value by weight that it is wished to have of nanoparticles with respect to the total weight of polymer plus nanoparticles themselves;
B is the weight of the polymer in 1 ml of solution at concentration C2.

At this point it is sufficient to transform the value in weight of the particles into volume of solution, mix solution and dispersion (polymer and $TiO_2$) and add the extra solvent to reach the desired concentration of the polymer C1.

Hereafter two examples relating to a percentage content of 5% and 20%, respectively, by weight of the titanium dioxide nanoparticles are given in detail.

Example 1

PMMA+$TiO_2$ 5% wt

The titanium dioxide nanoparticles were produced through hydrolysis of titanium isopropoxide (TTIP) in oleic acid (OLEA), according to the method described by Cozzoli P D, et al., "Low-temperature synthesis of soluble and processable organic-capped anatase $TiO_2$ nanorods" [4], incorporated here for reference.

Consequently, the starting data for the preparation of the solution of polymer and nanoparticles were the following:
Solution of nanoparticles: [$TiO_2$]=0.08M in toluene
Weight measured in 200 μl of solution $P_0$=10 mg
In order to have a final concentration of the polymer of 35 mg/ml (=film of 200 nm) it started out from a solution [PMMA]=100 mg/ml in toluene.

Therefore to have for example a solution containing in weight 5% TiO2 and 95% PMMA:

$$P_{TiO2} = \frac{0.05 \cdot 100}{1 - 0.05} = 5.26 \text{ mg}$$

In volume of solution it means $$V_{TiO2} = 200 \text{ μl} \cdot \frac{5.26}{10} = 105.2 \text{ μl}$$

Therefore, to have the concentrated polymer 35 mg/ml starting from a concentrated solution 100 mg/ml the total volume of solvent must be:

$$V = \frac{100}{35} = 2.857 \text{ ml}$$

Therefore, the final solution will be made up of:
1 ml of concentrated PMMA 100 mg/ml+105.2 μl of solution of TiO2+1.7518 ml of solvent.

In this way, by rotating 200 μl of solution at 1000 revs/minute for 1 minute on a square slide of side 2.5 cm, it is possible to obtain a film of measured thickness 200±10 nm.

Figure 1:
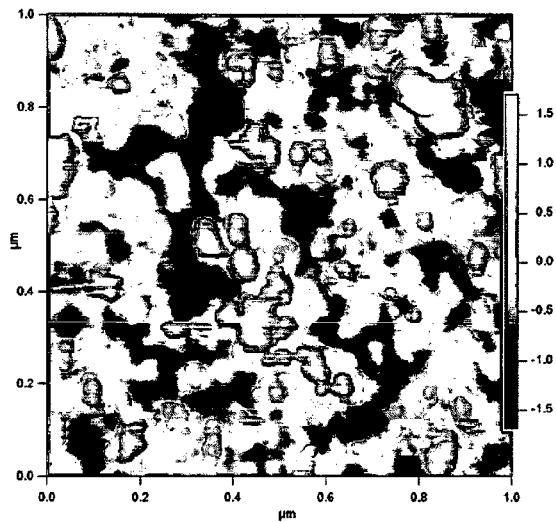
FIG. 1 represents an AFM topography of the surface of a film of PMMA+$TiO_2$ 5% wt obtained from a corresponding solution not treated according to the invention.

FIG. 1 represents an AFM topography of the surface of the film of PMMA+$TiO_2$ 5% wt obtained by the solution without UV treatment after 5 minutes of agitation with Vortex and 2 minutes of sonication at 59 kHz to best mix the two components.

Figure 2:
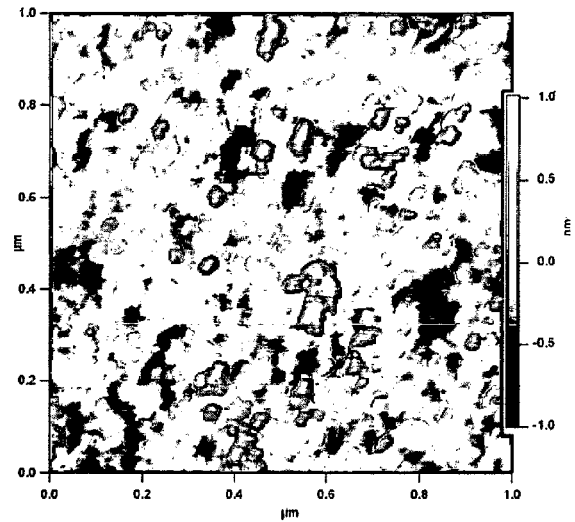
FIG. 2 represents an AFM topography of the surface of a film of PMMA+$TiO_2$ 5% wt obtained in a similar way to what was done for the film in FIG. 1, but from a solution treated according to the invention.

FIG. 2 represents an AFM topography of the surface of the film of PMMA+TiO2 5% wt obtained after an exposure of a solution to 355 nm of wavelength with pulsed laser (60 ps) and energy density times irradiation time equal to 360 mJs/$cm^2$, agitated for 1 minute with Vortex and deposited in an analogous way to what was done for the film in FIG. 1.

Figure 3:
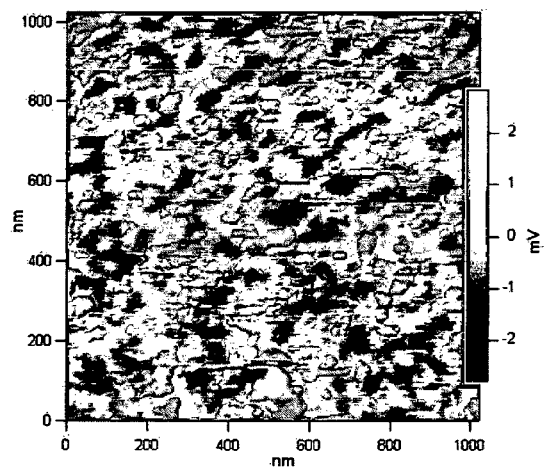
FIGS. 3 and 4 represent friction force measurements (obtained from the measurement of the deflection of the lever of an AFM microscope) of the film of FIG. 1 and of the film of FIG. 2, respectively.
Figure 4:
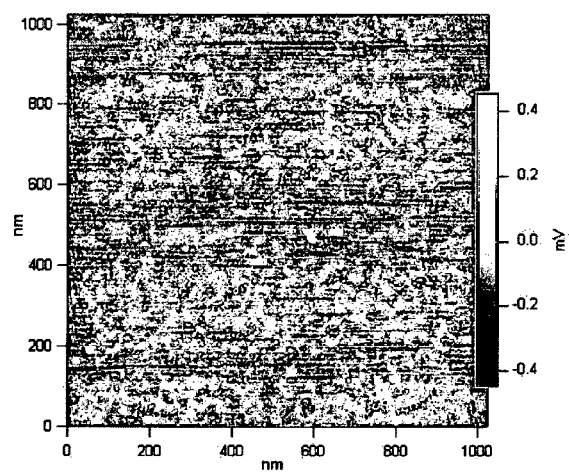

FIGS. 3 and 4 represent AFM friction force measurements, respectively, of the film of FIG. 1 and of the film of FIG. 2. The torsion of the cantilever with functionalised tip with end part OH induced by the friction forces during scanning allows a local measurement of the friction forces to be obtained.

Figure 5:
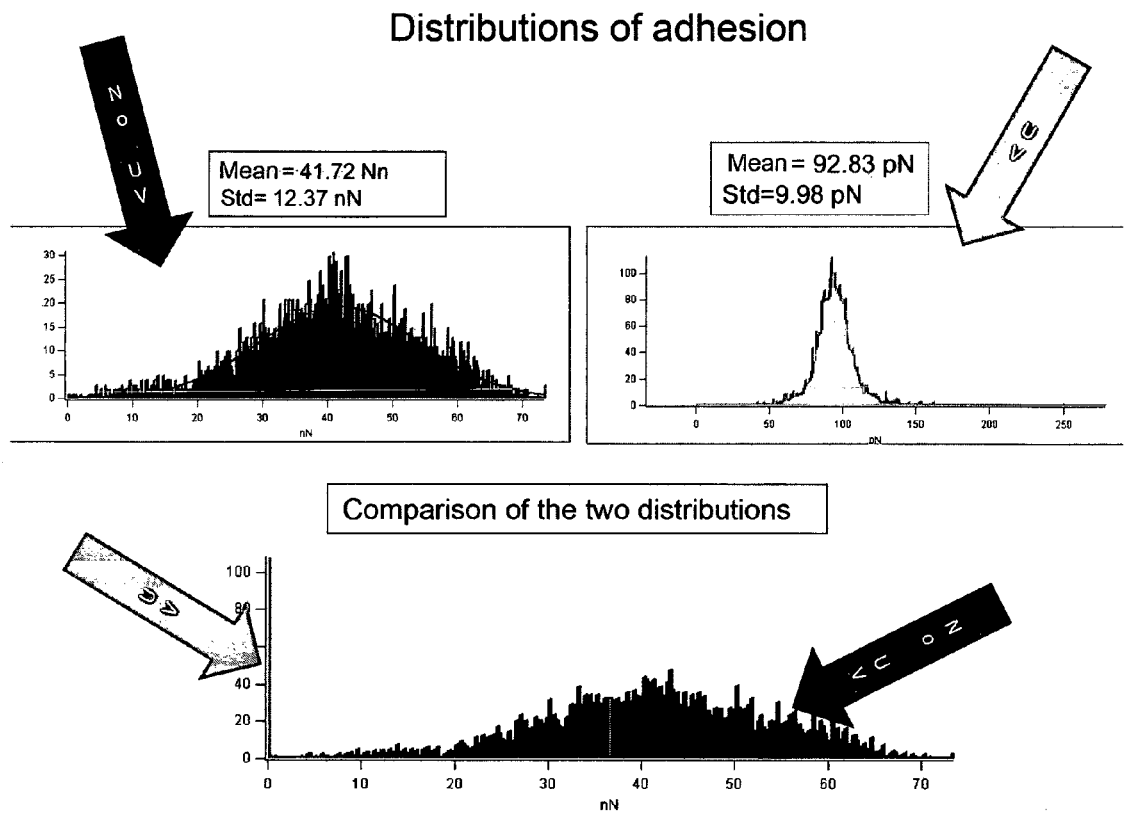
FIG. 5 represents graphs that illustrate the distributions of adhesion for the films of FIGS. 1 and 2.

All four of the aforementioned figures refer to a square scanning area of 1 μm. The measured roughness for the surface of FIG. 1 (non-irradiated solution) is 0.842 nm whereas for the area of FIG. 2 (irradiated solution) it is 0.323 nm, i.e. less than half. From the topography measurements apparently the surfaces seem similar for exposure of the nanoparticles to air. From the friction force FIGS. 3, 4 (there is greater friction with the oleic acid with which the nanoparticles are coated) it can, on the other hand, be seen that the film obtained after irradiation of the solution has an adhesion of 3 orders of magnitude lower, from 41.72 nN for FIG. 3 to 92.83 pN for FIG. 4, due just to the presence of the polymer at the interface with air (FIG. 5).

For transmittance and reflectance measurements thicker films were made. In order to have films of 1.5 μm thickness work was carried out with solutions the final concentration of the polymer of which was 111.11 mg/ml, starting from a concentration 250 mg/ml. The solution containing 5% in weight of nanoparticles therefore consists of:

1 ml [PMMA]=250 mg/ml+263.16 μl of solution of $TiO_2$+986.84 μl of toluene

Figure 6:
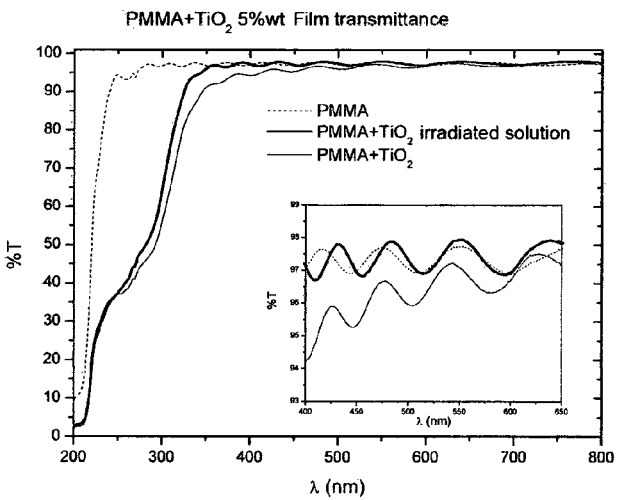
FIG. 6 represents a comparison of the transmittance between a film of just PMMA (broken line), an untreated film of PMMA+$TiO_2$ 5% wt (thin line), and a film of PMMA+$TiO_2$ 5% wt treated according to the invention (thick line). The transmittance in the visible range is shown in the insert.
Figure 7:
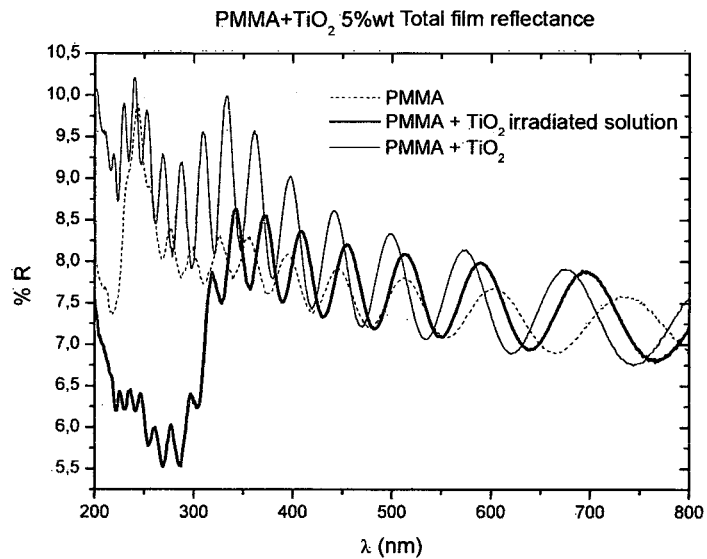
FIG. 7 represents a comparison of the total reflectance between a film of just PMMA (broken line), an untreated film of PMMA+$TiO_2$ 5% wt (thin line), and a film of PMMA+$TiO_2$ 5% wt treated according to the invention (thick line). The films are the same ones on which the measurements of FIG. 6 were carried out.
Figure 8:
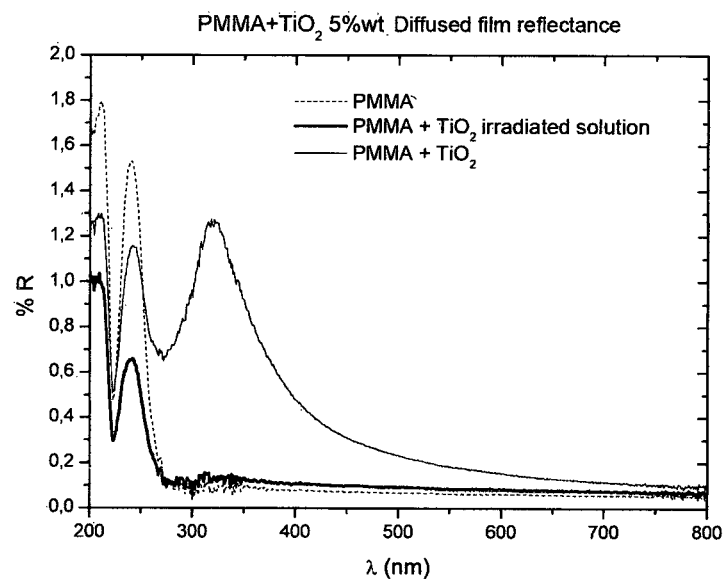
FIG. 8 represents a comparison of the reflectance diffused between a film of just PMMA (broken line), an untreated film of PMMA+$TiO_2$ 5% wt (thin line), and a film of PMMA+$TiO_2$ 5% wt treated according to the invention (thick line). The films are the same ones on which the measurements of FIGS. 6 and 7 were carried out.

FIGS. 6 to 8 show spectrophotometric measurements of films obtained from the same solution.

In particular, FIG. 6 shows a comparison of the transmittance between a film of just PMMA (broken line), an untreated film of PMMA+$TiO_2$ 5% wt (thin line), and a film of PMMA+$TiO_2$ 5% wt obtained after exposure of the solution to 355 nm of wavelength with pulsed laser (60 ps) and energy density times irradiation time equal to 360 mJs/$cm^2$ (thick line). The transmittance in the visible range is shown in the insert. All of the films of FIG. 6 have a thickness equal to 1.50±0.05 μm.

FIG. 7 shows a comparison of the total reflectance between the film of just PMMA (broken line), the untreated film of PMMA+$TiO_2$ 5% wt (thin line), and the film of PMMA+$TiO_2$ 5% wt obtained after exposure of the solution to 355 nm of wavelength with pulsed laser (60 ps) and energy density times irradiation time equal to 360 mJs/$cm^2$ (thick line). The films are the same ones on which the measurements of FIG. 6 were carried out.

FIG. 8 shows a comparison of the diffused reflectance between the film of just PMMA (broken line), the untreated film of PMMA+$TiO_2$ 5% wt (thin line), and the film of PMMA+$TiO_2$ 5% wt obtained after exposure of the solution to 355 nm of wavelength with pulsed laser (60 ps) and energy density times irradiation time equal to 360 mJs/$cm^2$ (thick line). The films are the same ones on which the measurements of FIGS. 6 and 7 were carried out.

As can be seen from FIG. 6, whereas the film obtained from the irradiation of the solution has the same transparency as the film of just polymer in the visible range, the film obtained without treatment of the solution has a non-negligible absorption. With regard to the total and diffused reflectance, FIGS. 7 and 8, it is clear how the films deposited without UV treatment of the solution suffer from the formation of aggregated structures on the surface of the film itself, whereas the film obtained after having irradiated the solution in the visible range has the same reflectance as the film made up of just the polymer and a substantial reduction, due to the absorption by the titanium dioxide nanoparticles, in the ultraviolet range. This special characteristic opens up the possibility of making and applying polymeric films doped with nanoparticles in the field of optics for anti-reflection materials and/or filters for ultraviolet light.

Example 2

PMMA+TiO2 20% wt

The titanium dioxide nanoparticles were produced in the way indicated with reference to example 1.

Consequently, the starting data for the preparation of the solution of polymer and nanoparticles were the following:

Solution of nanoparticles: [$TiO_2$]=0.08M in toluene
Weight measured in 200 μl of solution $P_0$=10 mg In order to have a final concentration of the polymer of 35 mg/ml (corresponding to a film of 200 nm) it started out from a solution [PMMA]=100 mg/ml in toluene.

Therefore, to have for example a solution containing in weight 20% $TiO_2$ and 80% PMMA:

$$P_{TiO2} = \frac{0.2 \cdot 100}{1 - 0.2} = 25 \text{ mg}$$

In volume of solution this means $$V_{TiO2} = 200 \text{ μl} \cdot \frac{25}{10} = 0.5 \text{ ml}$$

Therefore, to have the concentrated polymer 35 mg/ml starting from a concentrated solution 100 mg/ml the total volume of solvent must be:

$$V = \frac{100}{35} = 2.857 \text{ ml}$$

Therefore, the final solution will be made up of:

1 ml of concentrated PMMA 100 mg/ml+0.5 ml of solution of $TiO_2$+1.357 ml of solvent.

In this way, by rotating 200 μl of solution at 1000 revs/minute for 1 minute on a square slide of side 2.5 cm, it is possible to obtain a film of measured thickness 200±10 nm.

In order to better highlight the differences at the topographic level in this case the example was kept, with an energy density times irradiation time of 720 mJs/cm², in the region of adjustable dispersion.

FIGS. 9 to 12 show AFM measurements of films obtained from the same solution.

Figure 9:
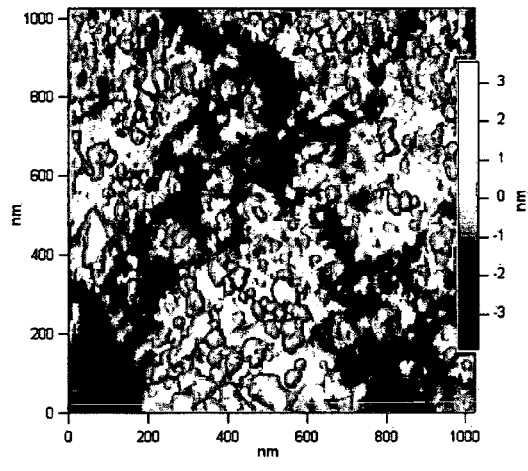
FIG. 9 represents an AFM topography of the surface of a film of PMMA+$TiO_2$ 20% wt obtained from a corresponding solution not treated according to the invention.

FIG. 9 shows an AFM topography of the surface of the film of PMMA+$TiO_2$ 20% wt obtained from the solution without UV treatment after 5 minutes of agitation with Vortex and 2 minutes of sonication at 59 kHz to best mix the two components.

Figure 10:
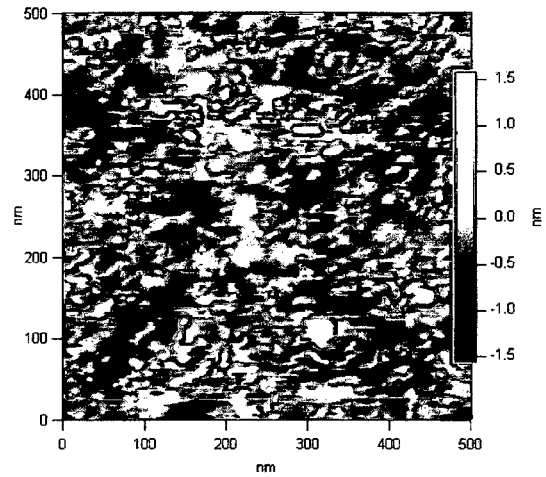
FIG. 10 represents an AFM topography of the surface of a film of PMMA+$TiO_2$ 20% wt obtained in a similar way to what was done for the film in FIG. 9, but from a solution treated according to the invention.

FIG. 10 shows an AFM topography of the surface of the film of PMMA+$TiO_2$ 20% wt obtained after exposure of the solution to 355 nm of wavelength with pulsed laser (60 ps) and energy density times irradiation time equal to 720 mJs/cm², agitated for 1 minute with Vortex and deposited in an analogous way to what was done for the film in FIG. 9.

Figure 11:
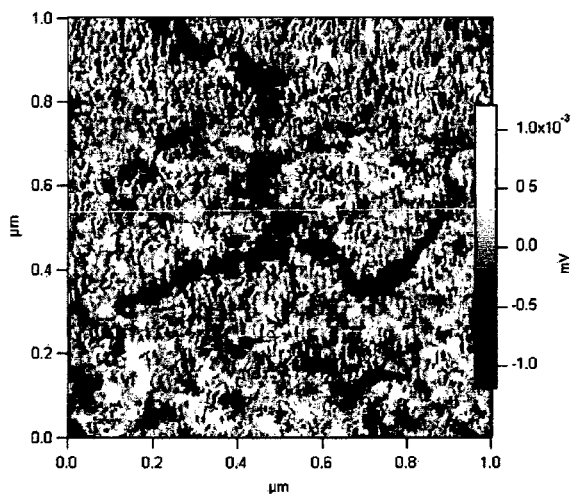
FIGS. 11 and 12 represent friction force measurements (obtained from the measurement of the deflection of the lever of an AFM microscope) of the film of FIG. 9 and of the film of FIG. 10, respectively.
Figure 12:
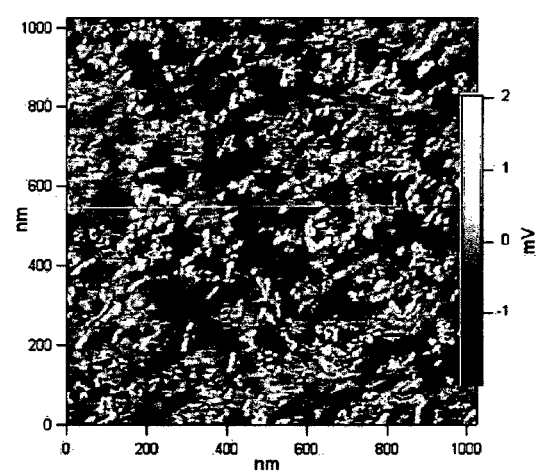

FIGS. 11 and 12 show an AFM friction force measurement, respectively, of the film of FIG. 9 and of the film of FIG. 10. The torsion of the cantilever with functionalized tip with end part OH induced by the friction forces during scanning allows a local measurement of the friction forces to be obtained.

Also in this example the measured roughness is much less for the films obtained from irradiated solutions, 0.771 nm instead of 1.680 nm of the films obtained from the untreated solution. Moreover, it is clear from the friction force measurements how in the case of films obtained from the treated solution (FIG. 12) on the surface there are few nanoparticles with respect to the case of the films obtained from classical solutions, without UV treatment (surface entirely covered with nanoparticles).

For the transmittance and reflectance measurements, similarly to the previous example films of 1.5 μm were deposited. The solution containing 20% in weight of nanoparticles therefore consists of 1 ml [PMMA]=250 mg/ml+1.250 ml of solution of $TiO_2$ FIGS. 13 to 15 show the spectra recorded in the UV-visible range of the films obtained from the same solution.

FIG. 13 shows a comparison of the transmittance between a film of just PMMA (broken line), an untreated film of PMMA+$TiO_2$ 20% wt (thin line), a film of PMMA+$TiO_2$ 20% wt obtained after exposure of the solution to 355 nm of wavelength with pulsed laser (60 ps) and energy density times irradiation time equal to 720 mJs/cm² (thick line). The transmittance in the visible range is shown in the insert. All of the films of FIG. 13 have a thickness equal to 1.50±0.05 μm.

FIG. 14 shows a comparison of the total reflectance between the film of just PMMA (broken line), the untreated film of PMMA+$TiO_2$ 20% wt (thin line), and the film of PMMA+$TiO_2$ 20% wt obtained after exposure of the solution to 355 nm of wavelength with pulsed laser (60 ps) and energy density times irradiation time equal to 720 mJs/cm² (thick line). The films are the same ones on which the measurements of FIG. 13 were carried out.

Figure 15:
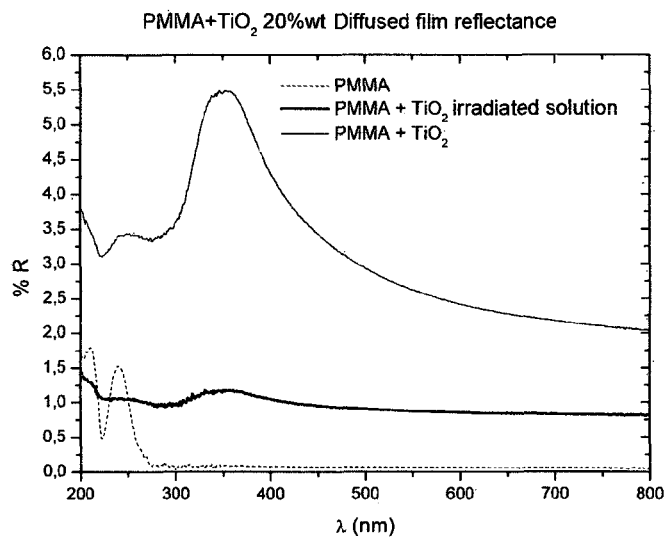
FIG. 15 represents a comparison of the diffused reflectance between a film of just PMMA (broken line), an untreated film of PMMA+$TiO_2$ 20% wt (thin line), and a film of PMMA+$TiO_2$ 20% wt treated according to the invention (thick line).

FIG. 15 shows a comparison of the diffused reflectance between the film of just PMMA (broken line), the untreated film of PMMA+$TiO_2$ 20% wt (thin line), the film of PMMA+$TiO_2$ 20% wt obtained after exposure of the solution to 355 nm of wavelength with pulsed laser (60 ps) and energy density times irradiation time equal to 720 mJs/cm² (thick line). The films are the same ones on which the measurements of FIGS. 13 and 14 were carried out.

The effects obtained are totally analogous, but even clearer, than those obtained for the solutions with 5% wt of $TiO_2$.

The graph of FIG. 16 shows the contact angle values with water (wettability index) for different films at different concentrations of titanium dioxide nanoparticles for different values of energy density times irradiation time. Two effects can be clearly seen that are due to the exposure to UV:

adjustable dispersion, at the decrease in the contact angle values with water with respect to the increase in energy density times irradiation time;

total dispersion, a condition that occurs when the contact angle value with water stays constant with respect to the increase in energy density time irradiation time (plateau areas of the curves).

The graph of FIG. 17 identifies two regimes of energy density times irradiation time separated by a curve formed from the experimental data possessed. Below the curve there is a dispersion regime that can be adjusted as wished of the particles in the films, whereas for values above the curve there is a total dispersion regime. From the graph it is therefore clear that, for the same concentration of the particles in the solution, it is possible to adjust their dispersion according to requirements, and at the limit even obtain total dispersion, by simply setting the dose of radiation to administer to the solution.

FIGS. 18 and 19 represent TEM images in bright field of thin slices of nanocomposite film, respectively not treated and treated with the technique according to the invention.

In the untreated film of FIG. 18 it is possibly to clearly see the agglomeration and segregation at the surface, whereas in the treated film of FIG. 19 it is possible to see a uniform dispersion.

The inserts of FIGS. 18 and 19 show the images of the corresponding dried solutions.

The method according to the invention therefore makes it possible to stabilize and homogenise a solution containing titanium dioxide nanoparticles and acrylate-based polymers with (optionally) total dispersion of the particles in the polymeric matrix, from which it is possible to obtain thin or thick films, keeping the properties of transparency of the polymer in the visible range and increasing its absorption in the ultraviolet range. The material thus produced has optical properties (refraction index, reflectance, absorption of ultraviolet rays) and physical properties (wettability, glass transition temperature $T_g$, hardness) that are adjustable as a function of the ratio between the concentrations in weight of nanoparticles and polymer.

The advantage of the invention described above is the total absence of chemical modifications of the polymer and of the nanoparticles, factors that would have a negative impact on the production costs, and being able to have thick films whilst keeping the properties of transparency of the polymer intact. Films manufactured in this way can vary their properties such as wettability of the surface, both with the same weight ratio of the constituent materials (varying the UV exposure time, and thus the dose irradiated) and varying the weight ratio itself. It is also possible to vary their refraction index by varying the weight ratio of the components in the total dispersion condition, keeping the characteristic transparency of the polymer.

Of course, without affecting the principle of the invention, the embodiments and the manufacturing details can be widely varied with respect to what has been described as a non-limiting example, without departing from the scope of the invention as defined by the following claims.

BIBLIOGRAPHICAL REFERENCES

[1] Sciancalepore C, et al. TiO$_2$ nanorods/PMMA copolymer-based nanocomposites: highly homogeneous linear and nonlinear optical material, *Nanotechnology*, 2008, 19: 205705 (8 pp).

[2] Convertino A, et al. TiO$_2$ colloidal nanocrystals functionalization of PMMA: A tailoring of optical properties and chemical adsorption, *Sensors and Actuators B*, 2007, 126: 138-143.

[3] Zan L, et al. A novel polymethyl methacrylate (PMMA)—TiO$_2$ nanocomposite and its thermal and photic stability, *Wuhan University Journal of Natural Sciences*, 2006, 11 (2): 415-418.

[4] Cozzoli P D, et al., Low-temperature synthesis of soluble and processable organic-capped anatase TiO$_2$ nanorods, *Journal of the American Chemical Society*, 2003, 125: 14539-14548.

The invention claimed is:

1. A method for preparing a colloid solution of titanium dioxide nanoparticles in a solution of acrylic resin in organic solvent, comprising:
   mixing titanium dioxide nanoparticles with a solution of acrylic resin in organic solvent to obtain said colloid solution;
   wherein said colloid solution is submitted to a stabilization treatment for preventing or reducing nanoparticle aggregation, said treatment comprising:
   irradiating the colloid solution with a pulsed coherent light having a wavelength comprised in the ultraviolet absorption band of the titanium dioxide nanoparticles.

2. A method according to claim 1, wherein said nanoparticles are provided in dispersed form in an organic solvent.

3. A method according to claim 1, wherein said coherent light is a laser light.

4. A method according to claim 1, wherein said wavelength is equal to or less than 355 nm.

5. A method according to claim 1, wherein said coherent light is irradiated with pulses having a pulse duration less than 1 ns.

6. A method according to claim 5, wherein said coherent light is irradiated with pulses having a pulse duration less than 100 ps.

7. A method according to claim 1, wherein said acrylic resin is chosen from the group consisting of homopolymers or copolymers of acrylic and/or methacrylic acid, and homopolymers or copolymers of alkyl esters of the acrylic and/or methacrylic acid, said acrylic resin being chosen to be transparent to the wavelength of the irradiated coherent light.

8. A method according to claim 1, wherein said coherent light is irradiated onto the colloid solution, the energy density times irradiation time absorbed by the colloid solution being less than 5000 mJs/cm$^2$.

9. A method for producing an acrylic resin film doped with titanium dioxide nanoparticles, comprising the preparation of a colloid solution of titanium dioxide nanoparticles in a solution of acrylic resin in organic solvent,
   wherein the said preparation comprises:
   mixing titanium dioxide nanoparticles with a solution of acrylic resin in organic solvent to obtain said colloid solution;
   wherein said colloid solution is submitted to a stabilization treatment for preventing or reducing nanoparticle aggregation, said treatment comprising:
   irradiating the colloid solution with a pulsed coherent light having a wavelength comprised in the ultraviolet absorption band of the titanium dioxide nanoparticles.

10. A method according to claim 9, wherein the weight concentration of titanium dioxide in the acrylic resin of the film is less than 20%.

* * * * *